United States Patent
Gadbois et al.

(10) Patent No.: US 9,171,561 B1
(45) Date of Patent: Oct. 27, 2015

(54) ASSEMBLIES AND METHODS FOR SLIDER ELECTRICAL CONNECTION CONTAINING THROUGH CIRCUIT ELECTRICAL CONNECTIONS

(71) Applicant: SEAGATE TECHNOLOGY LLC, Cupertino, CA (US)

(72) Inventors: Jason B. Gadbois, Shakopee, MN (US); Bradley Ver Meer, Savage, MN (US); Joseph Stephan, Eden Prairie, MN (US); Scott Matzke, Shakopee, MN (US); Ravishankar Ajjanagadde Shivarama, Eden Prairie, MN (US); Christopher Unger, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/277,192

(22) Filed: May 14, 2014

(51) Int. Cl.
*G11B 5/48* (2006.01)
*G11B 5/60* (2006.01)
*G11B 5/00* (2006.01)

(52) U.S. Cl.
CPC .............. *G11B 5/4853* (2013.01); *G11B 5/607* (2013.01); *G11B 5/6082* (2013.01); *G11B 2005/0021* (2013.01)

(58) Field of Classification Search
USPC ...................................... 360/234.5
See application file for complete search history.

(56) References Cited

U.S. PATENT DOCUMENTS

| | | | |
|---|---|---|---|
| 5,896,248 A * | 4/1999 | Hanrahan et al. | 360/234.5 |
| 6,985,332 B1 * | 1/2006 | Sluzewski et al. | 360/234.5 |
| 7,006,330 B1 * | 2/2006 | Subrahmanyam et al. | 360/234.5 |
| 7,027,264 B1 | 4/2006 | Subrahmanyam | |
| 7,064,928 B2 | 6/2006 | Fu | |
| 7,099,117 B1 * | 8/2006 | Subrahmanyam et al. | 360/245.9 |
| 7,446,977 B2 | 11/2008 | Nikitin | |
| 7,450,342 B2 * | 11/2008 | White et al. | 360/234.5 |
| 7,929,248 B2 * | 4/2011 | Zhu et al. | 360/234.5 |
| 7,952,833 B2 | 5/2011 | Smith | |
| 8,045,295 B2 | 10/2011 | Fu | |
| 8,164,858 B1 | 4/2012 | Moravec | |
| 8,351,158 B2 | 1/2013 | Zhu | |
| 8,400,736 B2 | 3/2013 | Greminger | |
| 8,902,547 B1 * | 12/2014 | Zhong | 360/234.5 |
| 2003/0128474 A1 | 7/2003 | Schulz | |
| 2004/0070880 A1 | 4/2004 | Fu | |
| 2007/0075056 A1 | 4/2007 | Ho | |
| 2008/0170326 A1 * | 7/2008 | Feng et al. | 360/99.04 |
| 2009/0195930 A1 * | 8/2009 | Lille | 360/234.5 |
| 2012/0044790 A1 * | 2/2012 | Shimazawa et al. | 369/13.32 |
| 2013/0286800 A1 | 10/2013 | Ver Meer | |

* cited by examiner

*Primary Examiner* — Mark Blouin
(74) *Attorney, Agent, or Firm* — Mueting, Raasch & Gebhardt, P.A.

(57) ABSTRACT

Assemblies and methods that include a flex circuit having a slider facing surface and an opposing back surface; a slider having a back surface and an opposing air bearing surface (ABS), the slider including an electrical connection region; and a through circuit electrical connection, that is in electrical connection with the electrical connection region of the slider, the back surface of the slider interfacing with the slider facing surface of the flex circuit.

19 Claims, 4 Drawing Sheets

US 9,171,561 B1

ASSEMBLIES AND METHODS FOR SLIDER ELECTRICAL CONNECTION CONTAINING THROUGH CIRCUIT ELECTRICAL CONNECTIONS

SUMMARY

Disclosed are assemblies that include a flex circuit having a slider facing surface and an opposing back surface; a slider having a back surface and an opposing air bearing surface (ABS), the slider including an electrical connection region; and a through circuit electrical connection, that is in electrical connection with the electrical connection region of the slider, the back surface of the slider interfacing with the slider facing surface of the flex circuit.

Also disclosed are a assemblies that include a flex circuit having a slider facing surface and an opposing back surface; a slider having a back surface and an opposing air bearing surface (ABS), the slider having a slider body, and at least one transducing head disposed within the slider body, an electrical connection region, the electrical connection region being a portion of the slider body; and an aperture circuit electrical connection, that is in electrical connection with the electrical connection region of the slider, the back surface of the slider body interfacing with the slider facing surface of the flex circuit.

Further disclosed are methods that include providing a slider, the slider having a slider body having a circuit facing surface and an opposing air bearing surface (ABS), at least one transducing head, and at least one electrical connection region; providing a flexible circuit, the flexible circuit having a slider facing surface, an opposing back surface, and an aperture spanning the slider facing surface and the opposing back surface; positioning the slider in the proximity of the flexible circuit so that the aperture is positioned adjacent the at least one electrical connection region; and delivering an electrically conductive material into the aperture to form a through circuit electrical connection.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
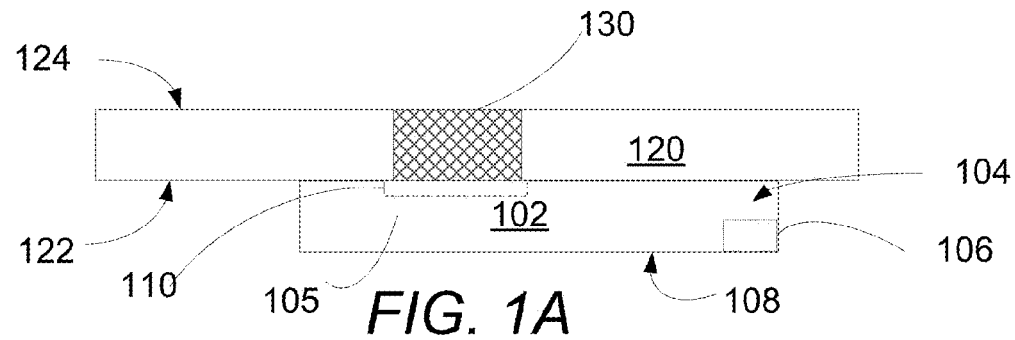
FIGS. 1A and 1B are cross sections of embodiments of disclosed assemblies.

Disclosed herein are assemblies and devices that can be used in larger articles, including for example memory or data storage devices. A cross section of an exemplary assembly is depicted in FIG. 1A. The exemplary assembly in FIG. 1A includes a flexible circuit 120, a slider 102, and a through circuit electrical connection 130.

A flexible circuit 120 can be described as having a slider facing surface 122 and an opposing back surface 124. A slider 102 can be described as having a back surface 104 and an opposing air bearing surface (ABS) 108. The slider facing surface 122 of the flexible circuit 120 interfaces with (or is positioned adjacent to) the back surface 104 of the slider 102. The opposing back surface 124 of the flexible circuit 120 faces away from the ABS 108 of the slider 102. Although not depicted in FIG. 1A, the opposing back surface 124 of the flexible circuit 120 may interface with portions of a larger device or assembly. A through circuit electrical connection 130 can be described as spanning the flexible circuit 120 from the slider facing surface 122 to the opposing back surface 124.

A flexible circuit 120 can be formed of single or multiple layers of a material. Exemplary materials can include insulating or dielectric layers, such as for example polyimide. Although not specifically shown in FIG. 1A, a flexible circuit 120 can include conductive traces formed on one or more than one surface of the flexible circuit 120. Such conductive traces can be made of electrically conductive materials, such as for example copper. Flexible circuits can optionally include cover layers that are disposed over the conductive traces.

A slider 102 can include a slider body 105. The slider body 105 can generally include an electrically conductive material as well as numerous types of layers and structures formed therein or thereon. Generally, a slider body 105 includes at least one transducing head 106. The at least one transducing head can further be characterized as a magnetic transducing head. In some embodiments, a slider 102 (or more specifically a slider body 105) can include more than one transducing head. In some embodiments, a slider 102 can include a transducing head to read data from a magnetic storage medium (referred to as read head or a read transducer) and a transducing head to write data to a magnetic storage medium (referred to as a write head or a write transducer). In some embodiments, a slider 102 can include a single read head and a single write head. In some embodiments, a slider 102 can include at least two read heads. In some embodiments, a slider 102 can include at least two write heads. In some embodiments, a slider 102 can include at least two read heads and at least two write heads. Disclosed devices may be advantageous in either two dimension magnetic recording ("TDMR") or multi-sensor magnetic recording ("MSMR") because they can provide additional contacts for the additional components without the need to place those additional contacts in the already limited space that is typically utilized for electrical connections.

A slider 102 can also include an electrical connection region 110. The electrical connection region 110 includes or is made of an electrically conductive material. The electrical connection region 110 functions to electrically connect some portion of the slider or some device or structure within the slider to the through circuit electrical connection 130.

In some embodiments, the electrical connection region 110 can be a portion of the slider body itself. As noted above, the slider body is generally made of an electrically conductive material, for example AlTiC, and as such, the electrical connection region 110 is a portion (or in effect all of the slider body that is in electrical communication with the electrical connection region) of the electrically conductive material. In some embodiments, the electrical connection region 110 as part of the slider body 105 may be advantageous when the through circuit electrical connection 130 is being utilized to electrically connect or is in electrical communication with a ground electrical connection. For example, the through circuit electrical connection 130 may be electrically connected to an electrical ground source, which may be chosen from any of those known to one of ordinary skill in the art (and not shown herein), and to an electrical connection region, which may be the slider body itself, thereby connecting the slider body to an electrical ground.

Electrical connection of the through circuit electrical connection 130 to an electrical connection region that is the slider body may be advantageous because precise placement of the material of the through circuit electrical connection material would not be as necessary because the entirety of the slider body would provide the desired material for the electrical connection. FIG. 1A, if it assumed that the electrical connection region 110 is a portion of the slider body 105 presents an example of a scenario where the through circuit electrical connection 130 may be utilized to connect the slider 102 to ground. In such embodiments, the surface of the through circuit electrical connection 130 that is congruous with the opposing back surface 124 of the flex circuit 120 could be in electrical connection with an electrical ground.

Figure 1B:
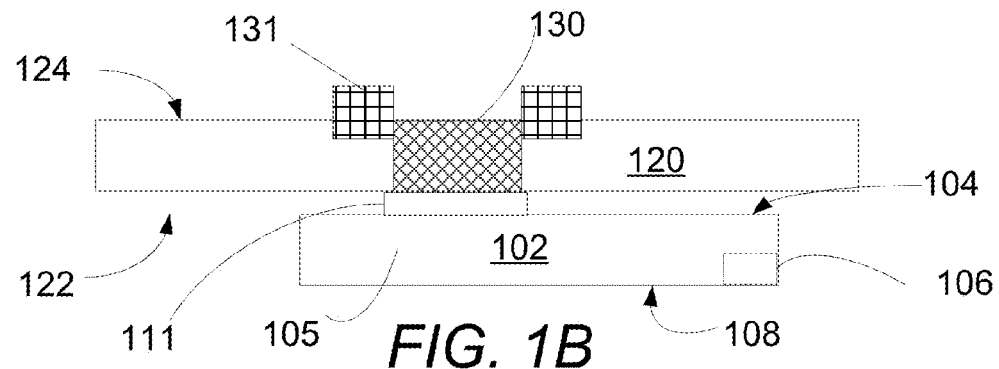

In some embodiments, the electrical connection region 110 can be a material other than the slider body. In some embodiments where the electrical connection region 110 is a material other than the slider body, the electrical connection region 110 can be more specifically characterized as a backside contact. FIG. 1B discloses an example of a backside contact 111. The components of FIG. 1B are numbered the same as those in FIG. 1A, with the exception of backside contact 111 and the addition of conductive contact 131. In some such embodiments, the backside contact 111 can be disposed on or disposed in the slider body 105 or another layer, material or structure disposed on or in the slider body. Exemplary backside contacts, such as the backside contact 111 depicted in FIG. 1B can be utilized in embodiments where it is desirable to utilize the through circuit electrical connection 130 to electrically connect a live or powered electrical connection to some structure or device within the slider 102. In such embodiments, the backside contact 111 can be in electrical connection or communication with a device or structure in the slider. Backside contacts 111 such as that depicted in FIG. 1B can also be utilized in embodiments where the through circuit electrical connection 130 is electrically connecting an electrical ground contact. Although a backside contact 111 may not be necessary in such embodiments (because the entirety of the slider body 105 may be able to function as an electrical connection), it may still be advantageous because a backside contact may be better able to be wetted by the material that is utilized to form the through circuit electrical connection.

In some embodiments where a backside contact 111 is utilized, a conductive contact on the flexible circuit 120 may also be utilized. FIG. 1B depicts an exemplary embodiment of a conductive contact 131. A conductive contact 131 can have various configurations and can be made of various materials. Generally, a conductive contact 131 includes at least an electrically conductive material in electrical contact with the through circuit electrical connection 130. The conductive contact 131 can also be in electrical communication or contact with a conductive trace (not shown) on the flexible circuit 120. In such embodiments, the through circuit electrical connection 130 can function to electrically connect a structure or device on or in the slider 102 with drive or control circuitry (for example) in a device or assembly containing the on slider device or structure. It should be noted that although not depicted in the embodiment of FIG. 1A, a conductive contact 131 can also be utilized in embodiments where the electrical connection region 110 is part of the slider body.

In some embodiments, a backside contact 111 can be in electrical communication with the at least one transducing head 106 in the slider 102. In some embodiments, a backside contact 111 can be in electrical communication with one of at least two transducing heads included in a slider 102. In some embodiments, a backside contact 111 can be in electrical communication with a resistive heater disposed on or in the slider 102. In some embodiments where the backside contact 111 is in electrical communication with a device such as a transducing head, a resistive heater, or otherwise, the through circuit electrical connection 130 can be utilized to connect the device to a powered electrical connection or an electrical ground. In some embodiments, exemplary devices can include a transducing head (whether the only transducing head or one of many) that is electrically connected to a powered electrical connection by a through circuit electrical connection. In some embodiments, exemplary devices can include a resistive heater that is electrically connected to an electrical ground connection by a through circuit electrical connection.

Disclosed devices also include through circuit electrical connections. Through circuit electrical connections can also be referred to as aperture electrical connections or via electrical connections. Exemplary through circuit electrical connections are exemplified in FIGS. 1A and 1B, for example. A through circuit electrical connection 130 generally spans the flexible circuit 120 from the slider facing surface 122 to the opposing back surface 124. The through circuit electrical connection 130 is generally composed of an electrically conductive material. Exemplary materials can include, for example copper (Cu), gold (Au), silver (Au), alloys thereof, including for example solder or conductive adhesives (for example those including Au or Ag). In some embodiments solder could be utilized. In some embodiments, a solder including tin (Sn), Ag and Cu can be utilized. In some embodiments, a solder including Sn, Ag, Cu, Ni, and Au can also be utilized. The through circuit electrical connection can also function, in some embodiments, as a mechanical connection between the flexible circuit and the slider. In some embodiments, additional mechanical connections can be formed, and in some embodiments, additional mechanical connections need not be formed.

Through circuit electrical connections could further be described by the aperture that forms or defines the connection. The through circuit electrical connection can be further described as contacting the electrical connection region of the slider without any conductive trace or other conductive portion as an electrical go between. More specifically, in some embodiments, disclosed through circuit electrical connections electrically connect or electrically contact the electrical connection region of the slider without including a conductive trace between the through circuit electrical connection and the electrical connection region. The through circuit electrical connection (or aperture electrical connection or via electrical connection) can also be described as an electrically conductive material that physically and electrically connects to the electrical connection region of the slider.

Figure 2A:
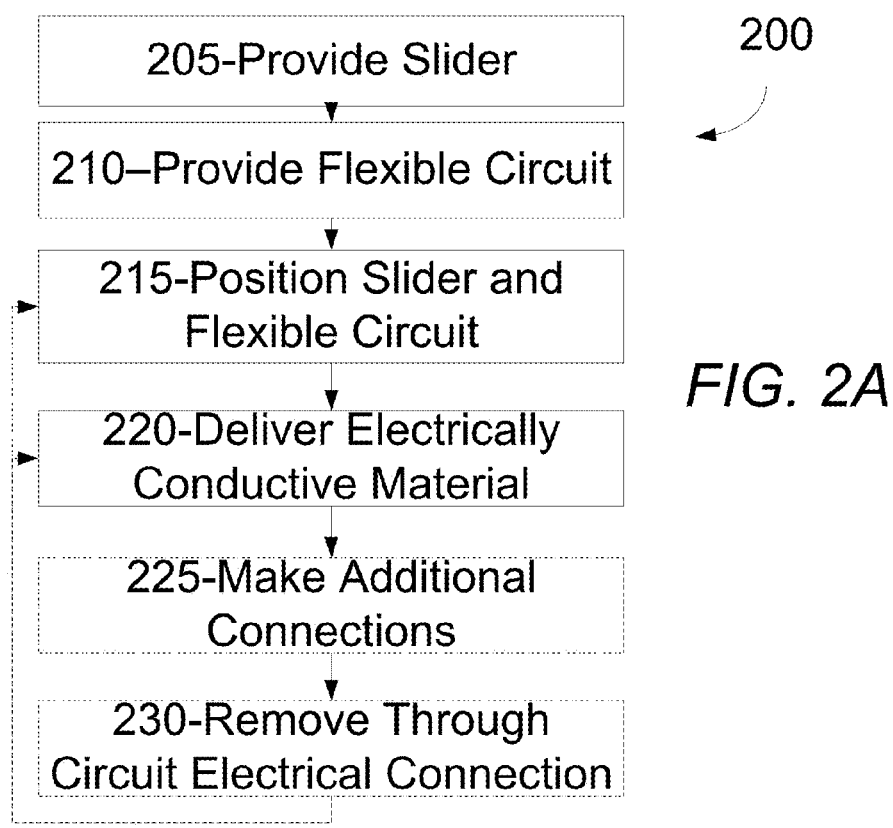
FIG. 2A is a flowchart depicting embodiments of disclosed methods and FIGS. 2B and 2C are cross sections showing articles at various stages in disclosed methods.

Also disclosed herein are methods. FIG. 2A presents a flowchart depicting exemplary methods disclosed herein. Exemplary methods 200 can include a step, step 205 of providing a slider. Sliders can have characteristics and features such as those described above with respect to FIGS. 1A and 1B, for example. Sliders can also include other features, devices or structures not disclosed or discussed herein. Providing a slider can include obtaining a slider from a different or separate process of manufacture (either carried out by the same entity or otherwise), obtaining a partially fabricated slider and finishing the manufacture thereof, purchasing a slider, or any other method of obtaining a slider having the features disclosed herein.

Figure 2B:
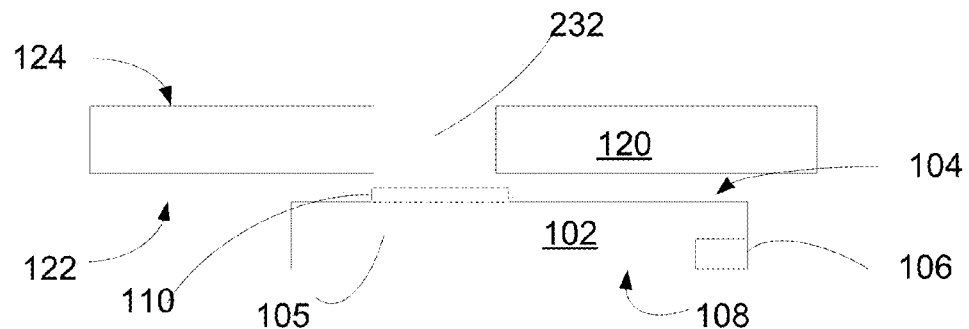

Exemplary methods can also include a step, step 210, of providing a flexible circuit. Flexible circuits can have some characteristics and features such as those described above with respect to FIGS. 1A and 1B, for example. However, flexible circuits utilized in disclosed methods either do not yet have a through circuit electrical connection, or have had a through circuit electrical connection removed therefrom. FIG. 2B shows a cross section of an exemplary slider and flexible circuit. The components in FIG. 2B are numbered similarly to those of FIG. 1B, with the deletion of the through circuit electrical connection 130 and addition of an aperture 232. At this stage in the method, the flexible circuit 120 includes an aperture 232. The aperture 232 spans the flexible circuit 120 from the slider facing surface 122 to the opposing back surface 124.

Flexible circuits can also include other features, devices or structures not disclosed or discussed herein. Furthermore, flexible circuits can be part of or can be configured to be part of a larger device or assembly. Providing a flexible circuit can include obtaining a flexible circuit from a different or separate process of manufacture (either carried out by the same entity or otherwise), obtaining a partially fabricated flexible circuit and finishing the manufacture thereof, purchasing a flexible circuit, or any other method of obtaining a flexible circuit having the features disclosed herein. It should also be noted that a flexible circuit without an aperture (see discussion surrounding FIG. 2B below) could be obtained and an aperture could then be formed in the flexible circuit before it is utilized in disclosed methods, for example.

It will be understood by one of skill in the art, having read this specification, that the order of the steps need not be carried out in the order discussed or claimed (unless an order is dictated by the steps themselves). With respect to steps 205 and 210, one of skill in the art will certainly understand that the order thereof is irrelevant.

Disclosed methods can also include a step, step 215, of positioning the slider and the flexible circuit in some fashion. Specifically, the step of positioning can include positioning the slider in the proximity of the flexible circuit, or vice versa. The location of the slider 102 and the flexible circuit 120 can be described by the location of the aperture 232 with respect to the electrical connection region 110. FIG. 2B shows a cross section of an exemplary position of a slider 102 with respect to a flexible circuit 120. The aperture 232 can be described as being positioned adjacent to, next to, over, on top of, or aligned with, the electrical connection region 110 of the slider 102. In some embodiments, the aperture 232 can be more specifically described as being positioned on top of and aligned with the electrical connection region 110 of the slider 102. The flexible circuit 120, the slider 102, or both may (but need not) include various other features to assist with the alignment of the two bodies with respect to each other. Positioning of the flexible circuit and the slider may be done by hand, automatically, or as part of a computer controlled process.

Figure 2C:
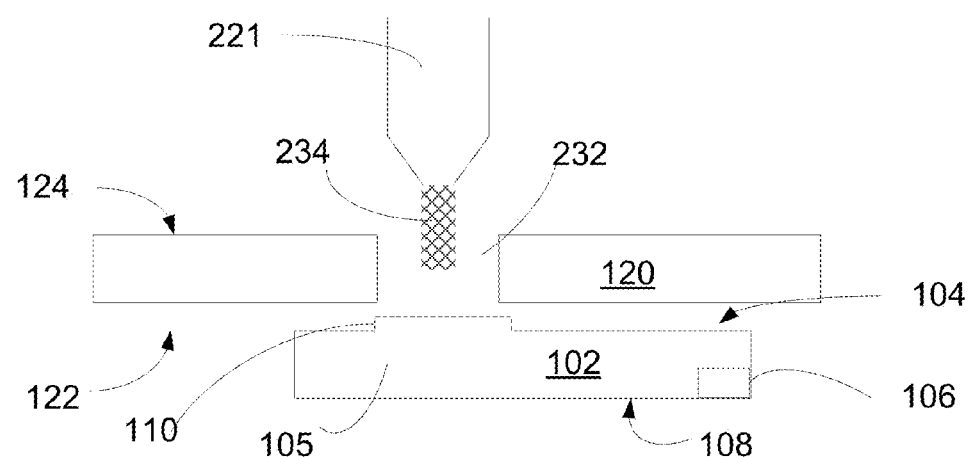

Disclosed methods can also include a step, step 220, of delivering an electrically conductive material into the aperture. FIG. 2C illustrates an exemplary way in which this step can be undertaken. As seen in FIG. 2C, in some embodiments, a machine 221 for delivery of the electrically conductive material can be utilized. In some embodiments, a solder jetting system can be utilized to deliver an electrically conductive material 234 into the aperture 232. Delivery of the electrically conductive material into the aperture forms a through circuit electrical connection. In some embodiments, a solder jetting system can be utilized to deliver solder into the aperture. In some embodiments, a solder ball could be jetted into the aperture. In some embodiments a ball placed adjacent (or for example between) the aperture and the electrical connection region (for example solder) could be reflowed. In some embodiments, solder that is already present at either the electrical connection region, the flexible circuit, or both can be reflowed, such that the process does not need to add material, only reflow what is already present. In some embodiments, a conductive adhesive could also be utilized by methods such as pin transfer. Furthermore, a soldering system a conductive adhesive system or a welding system could all be utilized to deliver an electrically conductive material into the aperture.

The amount of the electrically conductive material, the particular material of the electrically conductive material, and the particular parameters of its delivery are those that would be known by one of skill in the art, having read this specification.

Figure 3:
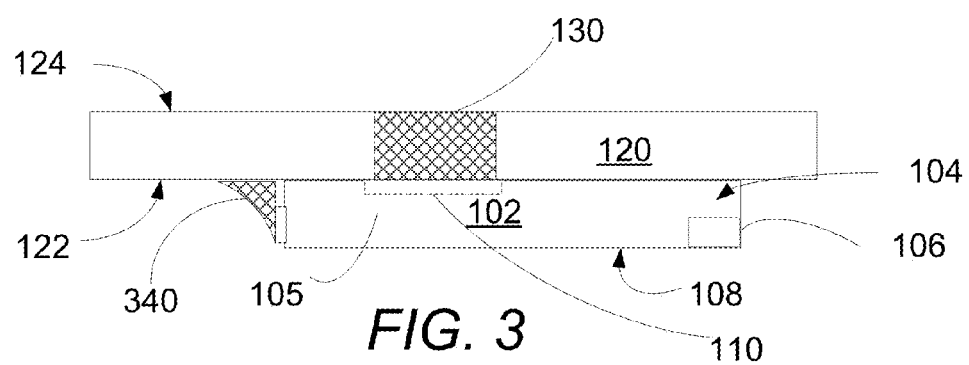
FIG. 3 is a cross section of an embodiment of a disclosed assembly that includes an optional additional connection between a slider and a flexible circuit.

Disclosed methods can also include optional steps. In some embodiments, step 225, making additional connections can also be undertaken. Additional, optional connections that can be made can include electrical connections, mechanical connections, or both. The additional, optional connections can be made between any surfaces of the flexible circuit and/or the slider. FIG. 3 shows an example of an article that was formed using an optional step of forming an additional connection. The additional connection 340 shown in FIG. 3, can function as a mechanical connection only, an electrical connection only, or both a mechanical and an electrical connection. An article such as that depicted in FIG. 3 could be referred to as utilizing a hybrid connection method in that it includes both a back side slider contact with a through circuit electrical connection 130 and an edge contact 340.

In some embodiments, step 230, removing a through circuit electrical connection can also be undertaken. This additional step can be referred to as "rework". If one or more components on the slider is determined to be unacceptable, the material of the through circuit electrical connection can be removed. This can be applicable, if for example the read element, the write element, or both are defective. A machine such as a desoldering pump or a machine that operates using similar principles can be utilized for this optional step. Once the undesired through circuit electrical connection has been removed by step 230, the flexible circuit and the slider can be positioned with respect to each other (step 215), or if the two pieces were not moved with respect to each other for the desoldering, the electrically conductive material can be delivered to the aperture (step 220).

Figure 4:
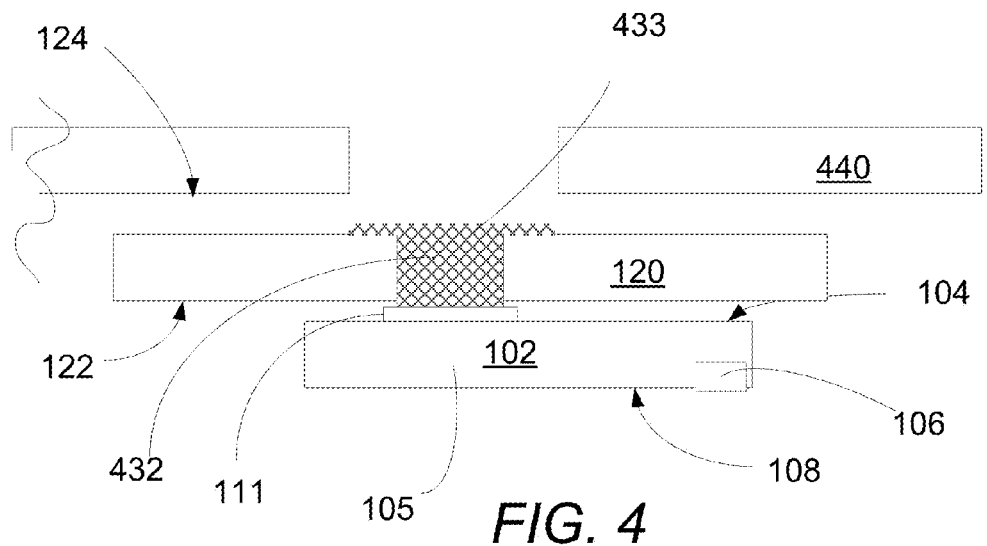
FIG. 4 is a cross section of an embodiment of a disclosed assembly that includes an optional load beam.

FIG. 4 depicts another exemplary embodiment of a device. The elements in FIG. 4 are numbered similarly to FIG. 1B. The embodiment of FIG. 4 also includes a load beam 440. The load beam 440 is positioned adjacent the flexible circuit 120. The load beam 440 also includes a through portion 433 that allows access to the aperture in order to form the through circuit electrical connection 432. This embodiment could be useful in methods of attaching the slider 102 to the flex circuit 120 after the flex circuit 120 is attached to the load beam 440.

Figure 5:
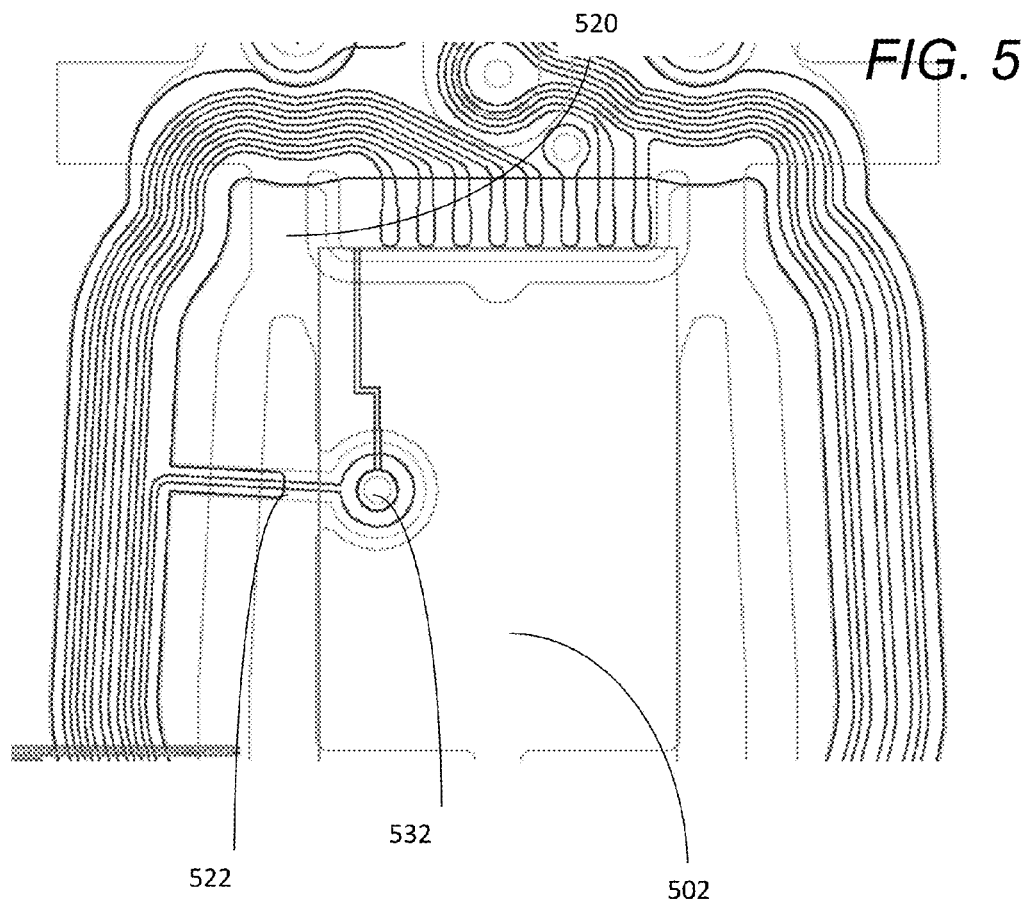
FIG. 5 is a line drawing showing a disclosed assembly including optional conductive traces.

FIG. 5 depicts a flex circuit containing conductive traces thereon in relation to an attached slider. This specific embodiment includes a flexible circuit 520 that includes conductive traces 522 thereon. The slider 502 (depicted by the rectangle) is attached to the flexible circuit 520 through a through circuit electrical connection located in the aperture 532. Such a configuration could be utilized to ground the slider or to provide a powered electrical connection for a device on the slider. This particular configuration shows that there is ample room on the flexible circuit 520 to locate the aperture and provide a conductive trace on the flexible circuit.

Figure 6A:
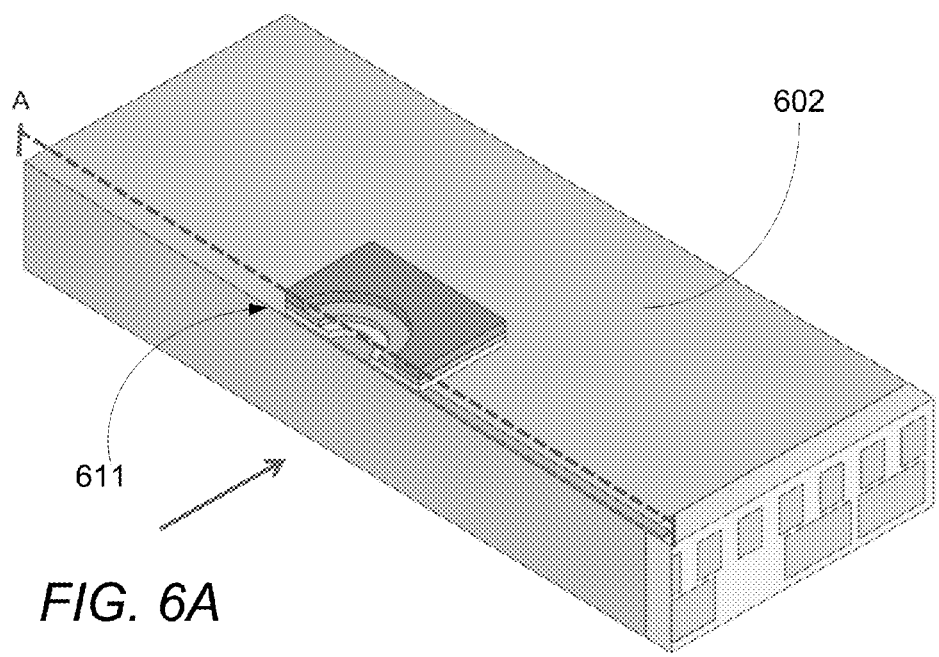
FIGS. 6A and 6B are perspective drawings of a disclosed slider showing one example of a specific construction of a backside contact.
Figure 6B:
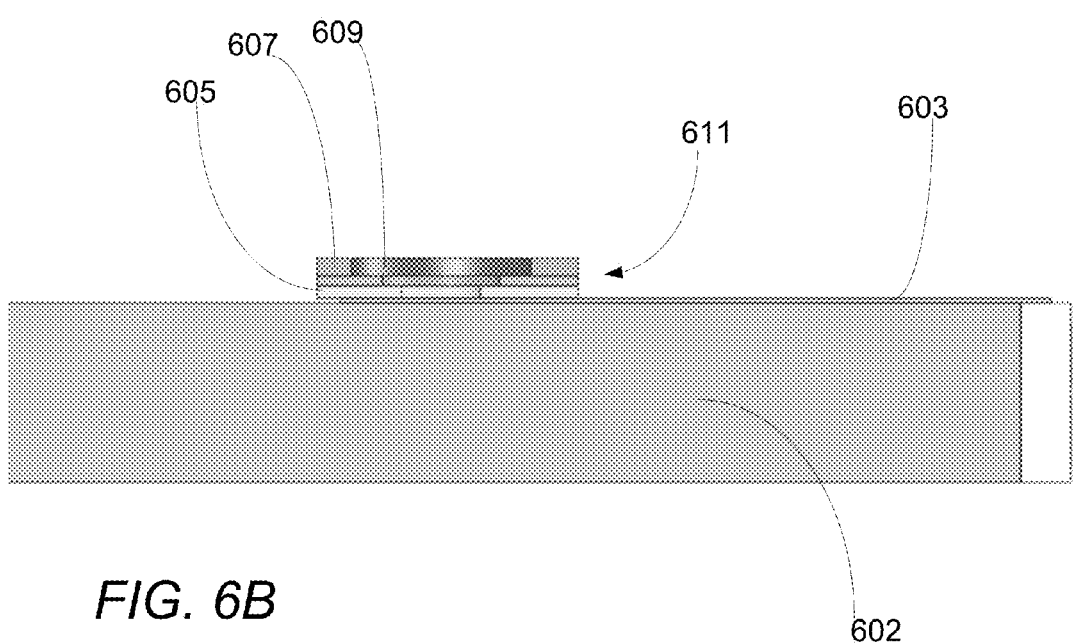

FIGS. 6A and 6B show a slider 602 with a backside contact 611. The backside contact 611 in this example can include more than one material and/or more than one layer. For example, layer 603 can be a conductive material such as Au, Ni. Cu, or some combination thereof. In some embodiments, layer 603 can function as a conductive trace on the back side of the slider, to provide an electrical connection to some other structure, not shown herein. In some embodiments, such a conductive trace could be providing an electrical connection between the gimbal assembly circuit and the device on the slider (e.g., reader, writer, etc.). Layer 605 can also be a conductive material such as Au, Ni. Cu or some combination thereof, for example. Layer 607 can be an electrically insulating material, for example. Layer 609 can be stainless steel for example, for example. In some embodiments, layers 605, 607 and 609 can all be a part of a gimbal assembly circuit element. In such embodiments, layer 609 can usually be stainless steel (SST), layer 607 can be an insulator (for example polyimide) and layer 605 can be Cu plated with Ni and Au. The SST (layer 609) in such an embodiment can function as the primary load carrying member of the circuit, the Cu (layer 605) can function as the electrical current carrying member and the two are separated by the polyimide (layer 607).

One skilled in the art will appreciate that the articles, devices and methods described herein can be practiced with embodiments other than those disclosed. The disclosed embodiments are presented for purposes of illustration and not limitation. One will also understand that components of the articles, devices and methods depicted and described with regard to the figures and embodiments herein may be interchangeable.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5. etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of methods of forming portions of near field transducers (NFTs) and articles formed thereby are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. An assembly comprising;
a flex circuit having a slider facing surface and an opposing back surface;
a slider having a back surface and an opposing air bearing surface (ABS), the slider comprising:
a slider body;
an electrical connection region, the electrical connection region being a portion of the slider body; and
a through circuit electrical connection, that is in electrical connection with the electrical connection region of the slider,
the back surface of the slider interfacing with the slider facing surface of the flex circuit.

2. The assembly according to claim 1, wherein the electrical connection region of the slider is electrically connected to the at least one read transducer in the slider.

3. The assembly according to claim 2, wherein the slider comprises at least two read transducers.

4. The assembly according to claim 2 further comprising at least one conductive contact disposed on the flex circuit and wherein the through circuit electrical connection electrically connects the at least one read transducer to the at least one conductive contact of the flex circuit.

5. The assembly according to claim 1, wherein the slider further comprises a resistive heater and wherein the electrical connection region is electrically connected to the resistive heater.

6. The assembly according to claim 5, wherein the through circuit electrical connection electrically connects the resistive heater to ground.

7. The assembly according to claim 1 wherein the slider body comprises AlTiC.

8. The assembly according to claim 1 further comprising a load beam holding the flex circuit the load beam having an opening there through aligned with the through circuit electrical connection.

9. An assembly comprising;
a flex circuit having a slider facing surface and an opposing back surface and a conductive contact;
a slider having a back surface and an opposing air bearing surface (ABS), the slider comprising:
a slider body, and
at least two read transducers disposed within the slider body,
an electrical connection region, the electrical connection region being a portion of the slider body; and
an aperture electrical connection, that is in electrical connection with the electrical connection region of the slider
the back surface of the slider body interfacing with the slider facing surface of the flex circuit and the conductive contact in electrical contact with the aperture electrical connection.

10. The assembly according to claim 9, wherein the slider body comprises AlTiC.

11. The assembly according to claim 9, wherein the aperture electrical connection is in electrical communication with a ground electrical connection.

12. The assembly according to claim 9 further comprising a load beam holding the flex circuit the load beam having an opening there through aligned with the aperture electrical connection.

13. The assembly according to claim 9, wherein the electrical connection region further comprises a backside contact disposed on the slider body, and comprising an electrically conductive material.

14. The assembly according to claim 9, wherein the conductive contact is also in electrical contact with a conductive trace.

15. A method comprising:
providing a slider, the slider comprising:
a slider body having a circuit facing surface and an opposing air bearing surface (ABS),
at least one transducing head, and
at least one electrical connection region that is a portion of the slider body;
providing a flexible circuit, the flexible circuit having a slider facing surface, an opposing back surface, and an aperture spanning the slider facing surface and the opposing back surface;
positioning the slider in the proximity of the flexible circuit so that the aperture is positioned adjacent the at least one electrical connection region; and
delivering an electrically conductive material into the aperture to form a through circuit electrical connection.

16. The method according to claim 15, wherein positioning the slider in proximity of the flexible circuit comprises positioning the flexible circuit over the slider so that the aperture is aligned with the electrical connection region of the slider.

17. The method according to claim 15, wherein delivering the electrically conductive material into the aperture is accomplished using a jetting system.

18. The method according to claim 17, wherein the jetting system delivers solder into the aperture.

19. The method according to claim 15 further comprising forming an additional connection between the slider and the flexible circuit.

\* \* \* \* \*